UNITED STATES PATENT OFFICE.

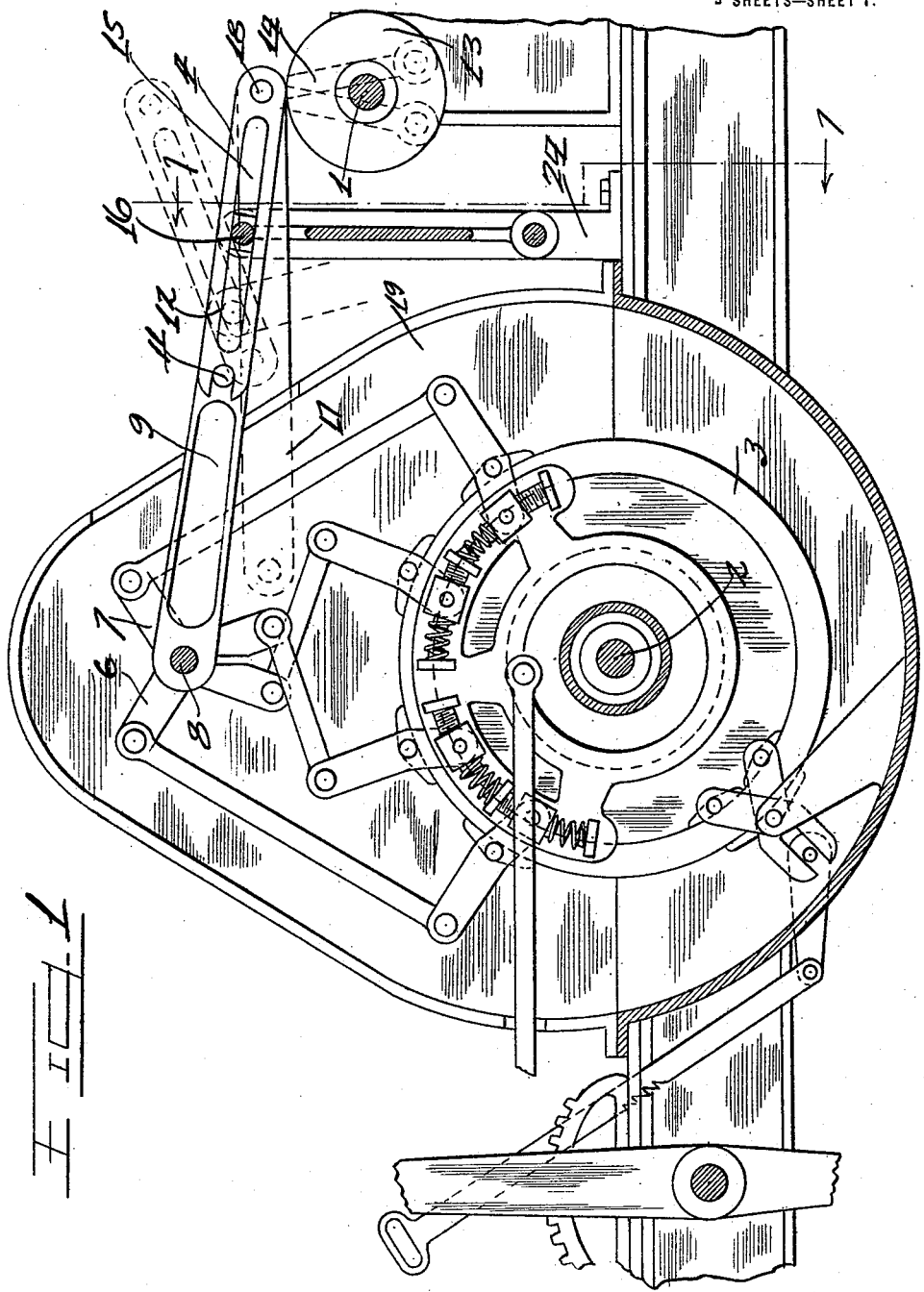

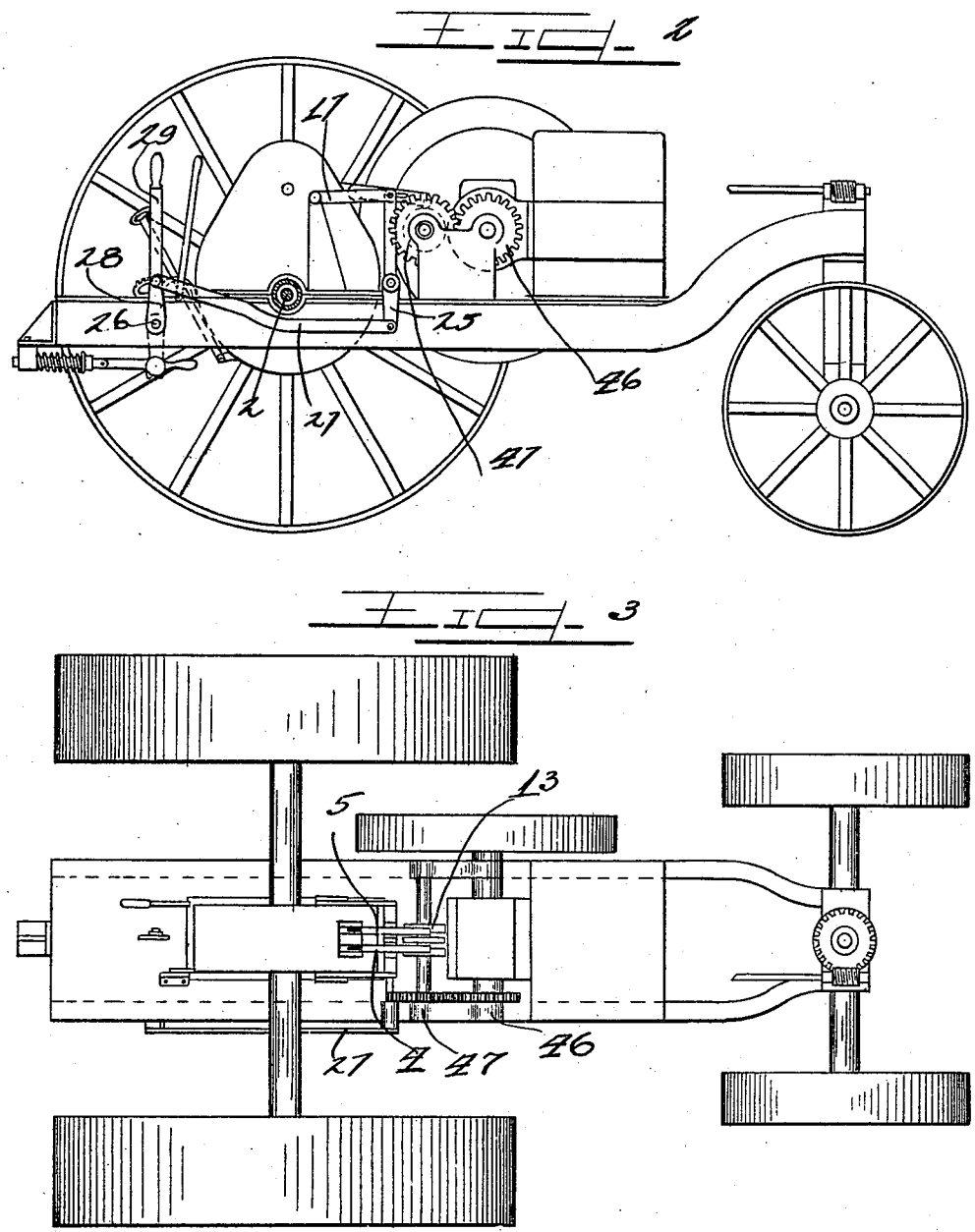

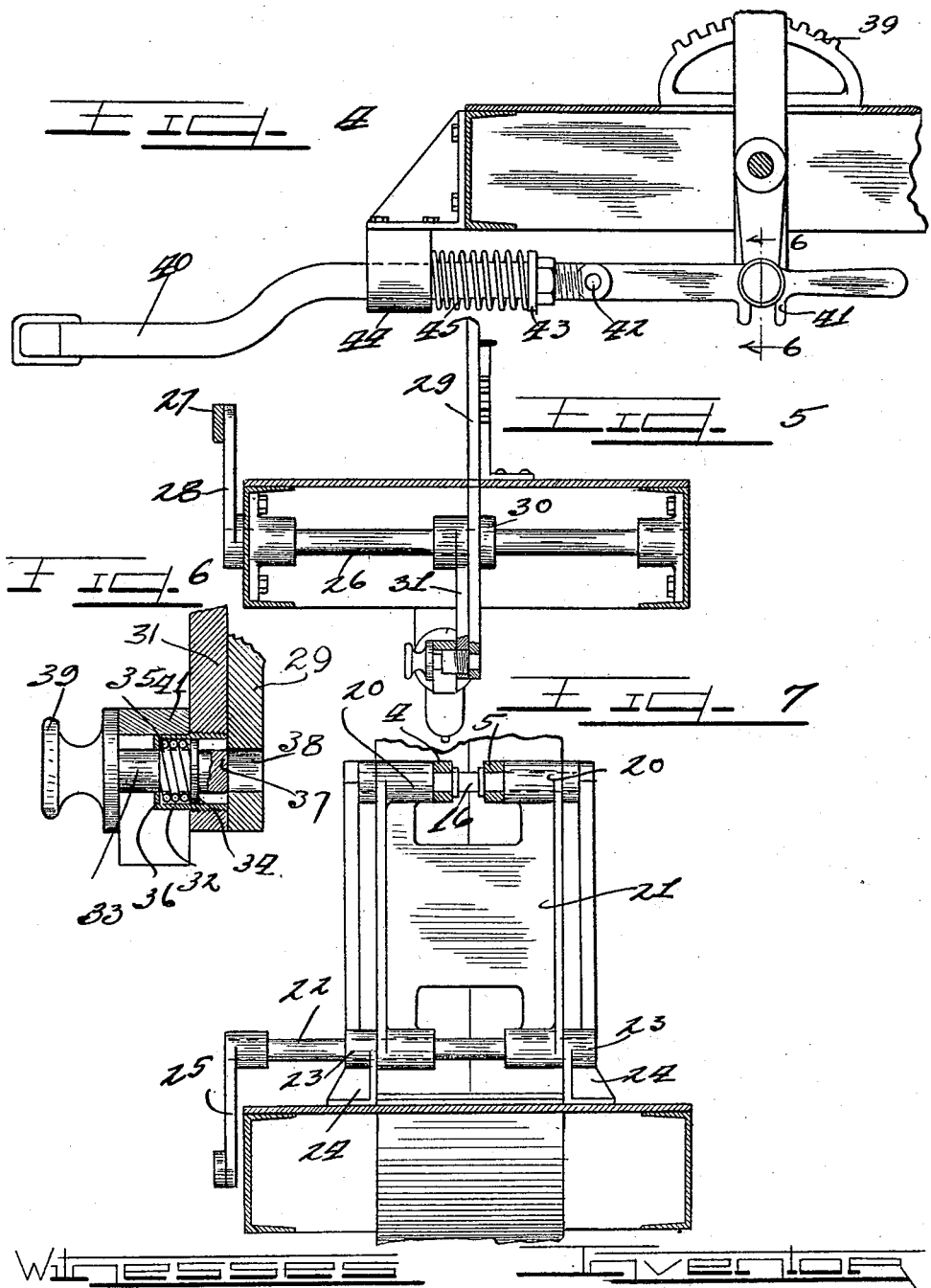

GEORGE G. BAYNE, OF BUSHNELL, ILLINOIS, ASSIGNOR OF ONE-FOURTH TO JOHN C. HOEHNEN, ONE-FOURTH TO CLEMENT G. BRANSTRATOR, AND ONE-FOURTH TO BAYNE MANUFACTURING COMPANY, A CORPORATION OF ILLINOIS, ALL OF BUSHNELL, ILLINOIS.

ADJUSTABLE TRANSMISSION MECHANISM.

1,415,512.   Specification of Letters Patent.   Patented May 9, 1922.

Application filed April 29, 1920. Serial No. 377,428.

*To all whom it may concern:*

Be it known that I, GEORGE G. BAYNE, a citizen of the United States, and a resident of Bushnell, in the county of McDonough and State of Illinois, have invented certain new and useful Improvements in an Adjustable Transmission Mechanism; and I do hereby declare that the following is a full, clear, and exact description of the same, reference being had to the accompanying drawings and to the numerals of reference marked thereon, which form a part of this specification.

My invention relates more specifically to a novel adjustment for a transmission mechanism whereby the driving power is affected by a variation in the load of a drawn apparatus.

It is an object of my invention to devise a variable speed that may be automatically controlled by the load.

It is a further object of my invention to provide a locking means for the adjustable transmission, which is broken upon hitching a draw bar thereto.

Other objects and advantages reside in the novel construction and arrangement of parts as more specifically pointed out hereinafter.

The invention (in a preferred form) is illustrated in the drawings and hereinafter more fully described.

On the drawings:

Figure 1 is a part elevational and part sectional view, showing an intermittent friction drive with which my invention is associated.

Figure 2 shows the application of my invention to a tractor.

Figure 3 is a top view of Figure 2.

Figure 4 is a view partly in section and partly in elevation showing the draw bar connection.

Figure 5 is a view partly in section and partly in elevation showing the means whereby the draw bar effects on automatic adjustment.

Figure 6 is a section on the line 6—6 of Figure 4.

Figure 7 shows a base in section and the adjustable fulcrum for the power levers.

As shown on the drawings:

Referring now more specifically to the drawings, in which similar reference numerals indicate the same features in the different views, 1 is a driving shaft which may receive its power from any convenient source; 2 is the driven shaft which may be the rear differential axle of a tractor or any other driven shaft. Motion is imparted to shaft 2 through a flanged wheel 3 connected therewith; a plurality of intermittent gripping devices are associated with the driven wheel 3 and connected to the driving shaft by a novel set of adjustably fulcrumed power levers 4 and 5.

There are two sets of gripping devices, one set being connected to the arms of a bell crank lever 6 mounted on shaft 8, while the other set is connected to the arms of a bell crank lever 7. Bell crank lever 6 is oscillated by power lever 4, while bell crank 7 is oscillated by power lever 5. It will be noted that as each bell crank is oscillated, one gripping device of each set is effective on the forward stroke, and the other gripping device is effective on the backward stroke. However, as the gripping devices with the bell crank structure is not a part of my invention, it is not necessary to enter into further detail in reference thereto.

My invention relates more particularly to the means for oscillating shaft 8 whereby the bell crank levers are oscillated. While I employ two similar power levers, one for each bell crank, the construction thereof is the same. Each power lever comprises a section 9 connected respectively to bell cranks 6 and 7. Each section 9 has a pin 11 for receiving the bifurcated end of the section 12 of each lever. The opposite end of each section 12 is pivoted to a link 14 connected to disk 13 upon shaft 1. A plurality of disks 13 may be used if so desired. The sections 12 of these levers have long slots 15 in which a fulcrum pin 16 operates. If pin 16 is shifted to the right the effective stroke of the gripping members will increase, while the power arm will be decreased. But if pin 16 is shifted to the left, the effective stroke of the gripping members will decrease while the power arm will increase. It should be noted that the sections of the power levers pivot on the axis 11 and form thereby a toggle lever as shown in dotted lines in Figure 1, and in order to keep the sections of the power levers in operative relation and cause pivot 18 to move in an arc to assist in breaking the toggle, a pair of bars 17 are pivoted at one end to the casing 19, and at the other end to pivot 18, as shown in Figures 1 and 2.

The fulcrum pin or shaft 16 is supported in a pair of journal members 20 carried by a bracket 21, which is firmly secured to a shaft 22, which is journalled in bearings 23 carried by the standards 24, which are supported on the floor of a vehicle or tractor. By rotating shaft 22 by means of the crank 25 the fulcrum shaft 16 may be shifted.

By referring to Figures 2 and 5, it will be seen that crank 25 is connected to shaft 26 by means of a link 27 and a crank 28, and that the rotation of shaft 26 will give a similar movement to shaft 22 to shift the fulcrum shaft 16. Shaft 26 may be rotated by means of a lever 29, having a hub 30 fitting rather loosely on shaft 26, the said lever extends below said shaft 26 and is connected to a crank arm 31, which is secured upon said shaft. The connection between lever 29 and crank 31 is of novel construction and comprises a hollow hub 32 having a flange 36 at its outer end and threaded upon its inner end which is secured in an aperture in the lower part of crank 31; a pin 33, having an annular shoulder 34 intermediate its ends is mounted in said hub, and a spring 35 is placed between said shoulder and the flange 36 of the hub. It will accordingly be seen that the spring 35 has a tendency to force the pin inwardly to bring the end 37 into an aperture 38 in the lever 29, whereby crank 31 and shaft 26 may be rotated by the lever. A locking segment 39 of well known construction may be used to hold lever 29 in its adjusted position.

A rather important feature of my invention exists in this connection between said lever 29 and crank arm 31, for it should be noted that pin 33 has a head 39ª whereby the pin 33 may be withdrawn from lever 29 and held in such withdrawn position by means of a draw bar 40, which has a yoke 41 at its forward end to straddle the pin 33. The draw bar may be made of a plurality of sections pivoted together at 42, to allow slight relative movement. The bar may be slidably supported in a bracket 44 in advance of which a nut 43 is screw threaded upon said draw bar, and a strong spring 45 inserted between the said bracket and nut. This spring, it is contemplated, will resist the average force imparted to the draw bar from a vehicle or implement that it may be towing. But if the pressure of the spring should be overcome for any of the various causes, such as mud or sand or obstructions, the said spring will yield, and the crank arm 31 will be rotated to the right whereby the fulcrum shaft 16 will be shifted through the above described mechanism so as to increase the power arm and reduce the stroke arm.

The operation is as follows:

As my invention is preferably adaptable for use on a tractor or vehicle, I have shown it mounted on a tractor. Any motor or engine may be used to impart motion to the gear wheels 46 and 47 to cause rotation thereof. The power levers 4 and 5 may be connected to the shaft of gear 47 by any appropriate means such as disks 13. As the said shaft rotates, sections 12 will fulcrum on shaft 16 and pivot 18 will ascend on a radius of bar 17; the sections 9 and 12 of the levers breaking in toggle like fashion, sections 9 operating the gripping devices and thus imparting rotation to the driven shaft. The fulcrum shaft 16 may be adjusted at any time by means of lever 29. But when it is desired to tow a vehicle or implement, pin 33 is withdrawn from lever 29 and the draw bar yoke placed over said pin, at which point the adjustment of fulcrum shaft 16 becomes automatic through the spring 45. When spring 45 yields, a pull will be imparted to crank 31 and through the aforedescribed mechanism, fulcrum shaft will be adjusted to increase the power arm and decrease the effective stroke of the gripping members.

It will accordingly be seen that I have invented an adjustable power transmission which is manually adjustable under certain conditions and automatically adjustable under other conditions, and that the automatic adjustment responds to the variation of loads, the power arm increasing with an increase of load.

I am aware that numerous details of construction may be varied through a wide range without departing from the principles of this invention, and I therefore do not purpose limiting the patent granted otherwise than necessitated by the prior art.

I claim as my invention:

1. The combination with a tractor, of a variable driving means therefor comprising a manually shiftable lever for varying said driving means, and means for rendering said lever inoperative and causing an automatic adjustment of said driving means.

2. The combination with the driving mechanism of a tractor, of manually adjustable means for varying the speed of said driving mechanism, a device for rendering said manually adjustable means inoperative, and a draw bar adapted to be connected to said means and adapted to hold said device in an inoperative position.

3. In a device of the class described, a power lever, a shiftable fulcrum therefor, means for manually shifting said fulcrum, a draw bar adapted to tow an apparatus, and adapted for attachment to said means, and means responsive to the pull of the draw bar for automatically shifting said fulcrum.

4. In a device of the class described, the combination with the driving mechanism of a tractor, of a lever connected to said mechanism for varying the speed thereof, means for breaking the connection between said lever and mechanism, a draw bar adapted for attachment to said means, and means responsive to the pull on said draw bar for automatically varying the speed of said driving mechanism.

5. The combination with a tractor, of variable speed driving means therefor comprising an operating lever for the driving means, a shiftable fulcrum for said lever, a draw bar, a yielding abutment for said draw bar, and means for connecting said fulcrum and draw bar for varying the position of said fulcrum according to the load on said draw bar.

6. In a tractor transmission, an intermittent driving mechanism, comprising a rotary driving member, pawls cooperating therewith, a lever for operating said pawls, a shiftable fulcrum for said lever, a yieldingly supported draw bar, and means for connecting said fulcrum and draw bar for varying the position of said fulcrum according to the load on the draw bar.

7. In a tractor transmission, a rotary member, pawls cooperating with said member, a lever for operating said pawls, a shiftable fulcrum for said lever, a control lever, a draw bar, and means for optionally connecting said lever or draw bar to said shiftable fulcrum.

8. In a tractor transmission, variable speed driving mechanism, means for varying the speed of said transmission comprising a control lever having a shiftable connection, a draw bar adapted to fit said connection and render said control lever inoperative.

9. In a tractor transmission, variable speed driving mechanism comprising a shiftable element, means for shifting said element comprising a control lever having a slidable spring-pressed connecting pivot, a draw bar adapted to fit over said pivot in retracted position and hold said control lever inoperative.

In testimony whereof I have hereunto subscribed my name in the presence of two subscribing witnesses.

GEORGE G. BAYNE.

Witnesses:
G. K. COOPER,
N. HINMAN.